United States Patent
Chacko et al.

(10) Patent No.: US 11,616,817 B2
(45) Date of Patent: Mar. 28, 2023

(54) SYSTEM AND METHOD FOR CONTROLLING DATA INTERCEPTION IN A COMMUNICATION SYSTEM

(71) Applicant: HCL Technologies Limited, New Delhi (IN)

(72) Inventors: Simy Chacko, Chennai (IN); Venkatesh Shankar, Chennai (IN); Ramesh Gurusamy, Chennai (IN); Vijay Kulandaisamy, Chennai (IN)

(73) Assignee: HCL Technologies Limited, New Delhi (IN)

( * ) Notice: Subject to any disclaimer, the term of this patent is extended or adjusted under 35 U.S.C. 154(b) by 101 days.

(21) Appl. No.: 17/197,937

(22) Filed: Mar. 10, 2021

(65) Prior Publication Data

US 2021/0289005 A1 Sep. 16, 2021

(30) Foreign Application Priority Data

Mar. 11, 2020 (IN) .............................. 202011010475

(51) Int. Cl.
*H04L 9/40* (2022.01)

(52) U.S. Cl.
CPC ........ *H04L 63/306* (2013.01); *H04L 63/0435* (2013.01); *H04L 63/0492* (2013.01); *H04L 63/0807* (2013.01)

(58) Field of Classification Search
CPC ............. H04L 63/0435; H04L 63/0492; H04L 63/0807
See application file for complete search history.

(56) References Cited

U.S. PATENT DOCUMENTS

| | | | |
|---|---|---|---|
| 8,800,027 B1 * | 8/2014 | Ackerman | H04L 9/321 |
| | | | 380/258 |
| 9,129,133 B2 | 9/2015 | LaFever et al. | |
| 9,529,733 B1 * | 12/2016 | Sokolov | G06F 21/31 |
| 2013/0159021 A1 | 6/2013 | Felsher | |
| 2018/0218167 A1 | 8/2018 | Narayanaswamy et al. | |
| 2019/0036708 A1 * | 1/2019 | Fregly | H04L 9/3263 |
| 2019/0109830 A1 * | 4/2019 | McFarland | G16H 80/00 |

* cited by examiner

*Primary Examiner* — William S Powers

(57) ABSTRACT

The present disclosure relates to a system and method for controlling data interception in a communication network. One or more requests from a user for accessing one or more microservices are received through an Application Programming Interface (API). Information associated with one or more requests is the detected and requests are classified as secured microservice request and non-secured microservice request. The information is detected through predefined rules. Authentication token is then issued for secured microservice based on the detecting. The authentication token stores information detected by the detector in a geo storage system. The one or more requests are then routed according to the authentication token towards one or more corresponding microservices of the one or more microservices.

15 Claims, 8 Drawing Sheets

SYSTEM AND METHOD FOR CONTROLLING DATA INTERCEPTION IN A COMMUNICATION SYSTEM

CROSS-REFERENCE TO RELATED APPLICATIONS AND PRIORITY

The present application claims benefit from Indian Complete Patent Application No. 202011010475 filed on 11 Mar. 2020, the entirety of which is hereby incorporated by reference.

TECHNICAL FIELD

The present disclosure in general relates to the field of a telecommunication network. More particularly, the present disclosure relates to system and method for system controlling data interception in a communication system.

BACKGROUND

Technology advancement has resulted in development of variety of applications widely used for availing variety of electronic services. Usage of such variety of applications leads to development of huge amount of data. In order to ensure smooth data exchange and successful operation of the variety of Applications, different type of Application programming Interface (APIs).

The API's acts as communication protocol and routes a data request to a respective service. However, these days, data privacy has become a matter of concern. In current scenario, service providers are focusing more on ensuring privacy concern of users. The service providers address security concern by limiting user's access rights at a microservice level.

User's rights are limited so that real values of Personal Identifiable Information (PII) are not compromised. Limiting user's right many a times involve execution of complex data exchange rules. Such complex rules may limit access of the user and may result in improper operation of the application.

SUMMARY

Before the present system and method controlling data interception in a communication system is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only and is not intended to limit the scope of the present application. This summary is provided to introduce concepts related to systems and methods for assigning dynamic operation of devices in a communication network. This summary is not intended to identify essential features of the claimed subject matter nor is it intended for use in determining or limiting the scope of the claimed subject matter.

In one implementation, a system for controlling data interception in a communication network is shown. The system comprises a processor and a memory coupled to the processor. The memory stores a plurality of instructions to be executed by the processor and the processor is configured to receive, through an Application Programming Interface (API), one or more requests from a user for accessing one or more microservices, detect, through a detector, information associated with one or more requests. The information is detected through predefined rules. The processor is further configured to issue through a route propagator, an authentication token for each of the one or more request based on the detecting. The authentication token stores information detected by the detector. The processor is further configured to route, through the route propagator, the one or more requests according to the authentication token towards the one or more corresponding microservices of the one or more microservices.

In another implementation, a method for controlling data interception in a communication network is shown. The method comprises receiving, through an Application Programming Interface (API), one or more requests from a user for accessing one or more microservices and detecting, through a detector, information associated with the one or more requests. The information is detected through predefined rules. The method further comprises issuing, through a route propagator, an authentication token for each of the one or more request based on the detecting. The authentication token stores information detected by the detector. The method further comprises routing, through a route propagator, the one or more requests according to the authentication token towards the one or more corresponding microservices of the one or more microservices.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "comprising", "receiving", "determining", "assigning" and other forms thereof, are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for assigning dynamic operation of devices in a communication network are now described. The disclosed embodiments of the systems and methods for assigning dynamic operation of devices in a communication network are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for assigning dynamic operation of devices in a communication network is not intended to be limited to the embodiments illustrated but is to be accorded the widest scope consistent with the principles and features described herein.

Conventionally, edge computing systems may have pre-configured and hard coded data analytics models and algorithms for specific operations. Generally, it may not be possible to dynamically configure and select analytical models for one or more edge devices based on one or more contextual attributes. This may lead to inefficient network bandwidth allocation for the one or more edge devices in the edge computing systems. Further, the conventional edge systems may lack an effective handling of network slicing mechanism dynamically, as per changing requirement of the one or more edge devices in a location. The lack of the effective handling of the network slicing mechanism may be due to standalone edge devices with limited processing and decision-making capability.

The present subject matter overcomes a problem of data security in a communication network. The present subject matter relates to a system controlling data interception in a communication network. One or more requests are received from a user for accessing one or more microservices. Information associated with one or more requests is then detected through predefined rules. After detecting the information, an authentication token for each of the one or more request is issued and the one or more request are routed towards one or more corresponding microservices according to the authentication token.

Figure 1:
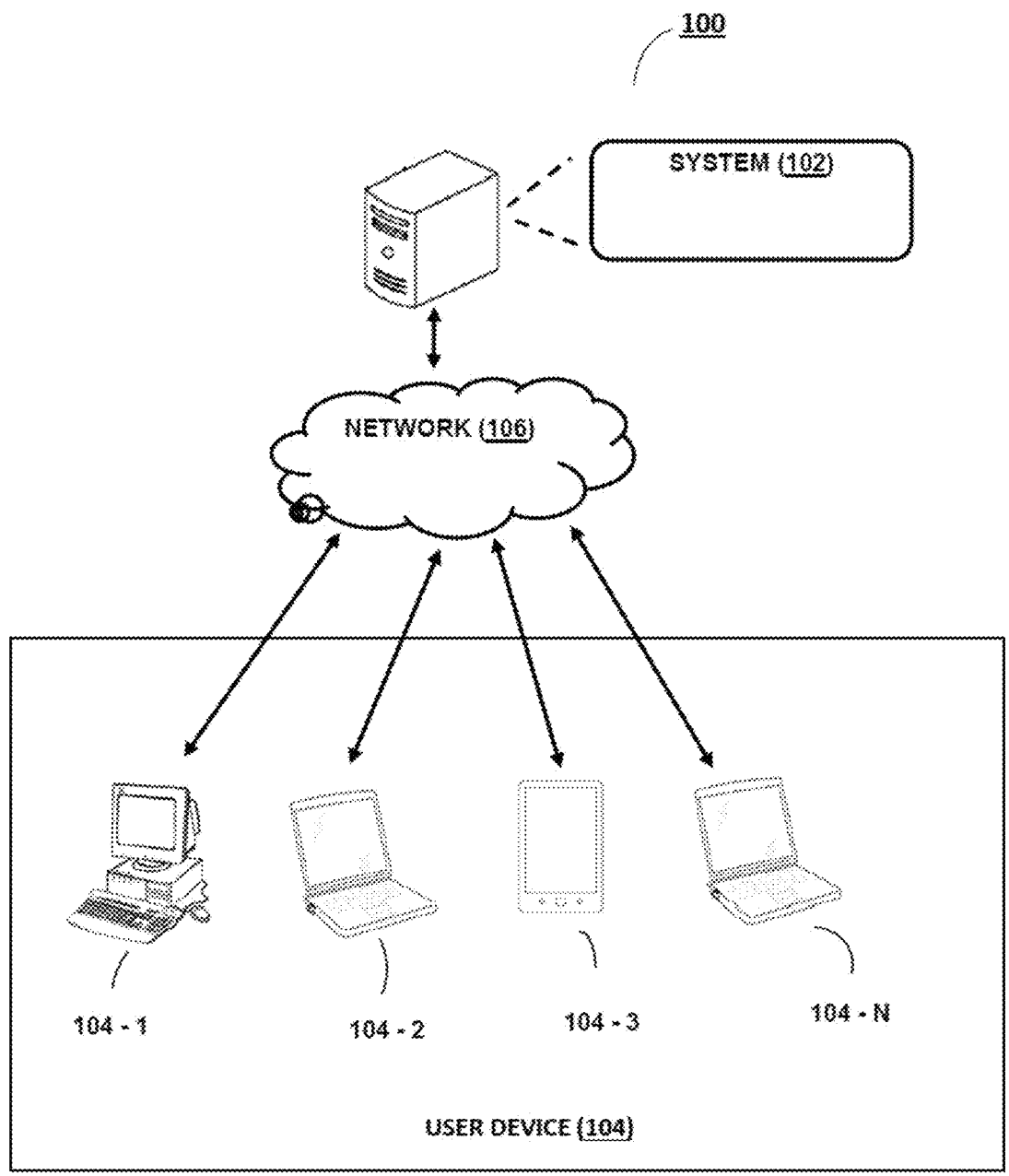
FIG. 1 illustrates a network implementation of a system for controlling data interception in a communication network, in accordance with an embodiment of the present subject matter.

Referring now to FIG. 1, a network implementation 100 of a system 102 for controlling data interception in a communication network is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network, or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may receive one or more requests associated with one or more devices connected to a communication network 106. The one or more requests may also be referred as one or more microservice requests.

Figure 2:
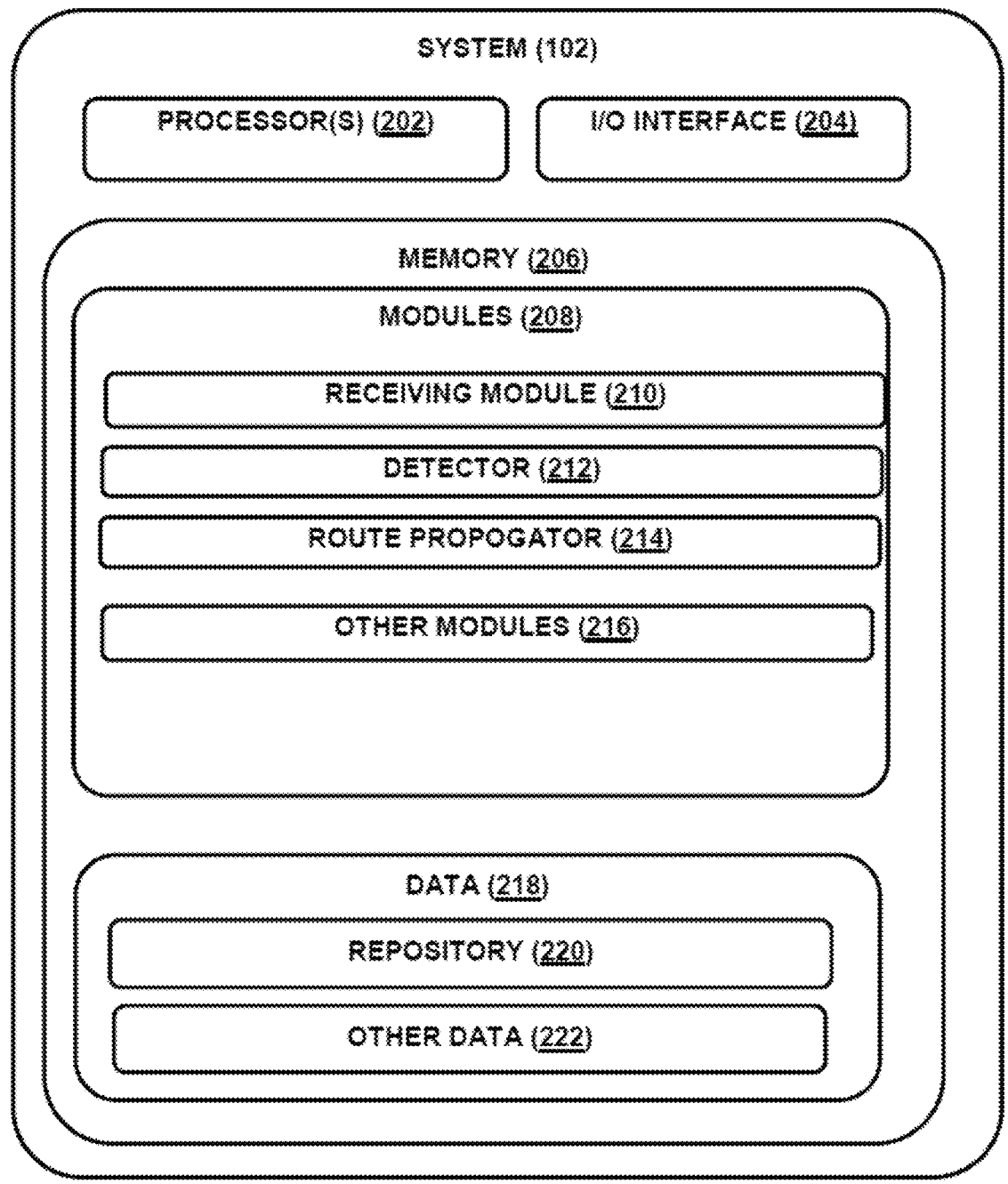
FIG. 2 illustrates an architecture of the system for controlling data interception in a communication network, in accordance with an embodiment of the present subject matter.

Referring to FIG. 2, configuration of the system 102 is shown. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor may be configured to fetch and execute computer-readable instructions stored in the memory.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

In one implementation, a user may access the system 102 via the I/O interface. The user may be registered using the I/O interface in order to use the system 102. In one aspect, the user may access the I/O interface of the system 102 for obtaining information, providing input information, or configuring the system 102.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include data.

Figure 3:
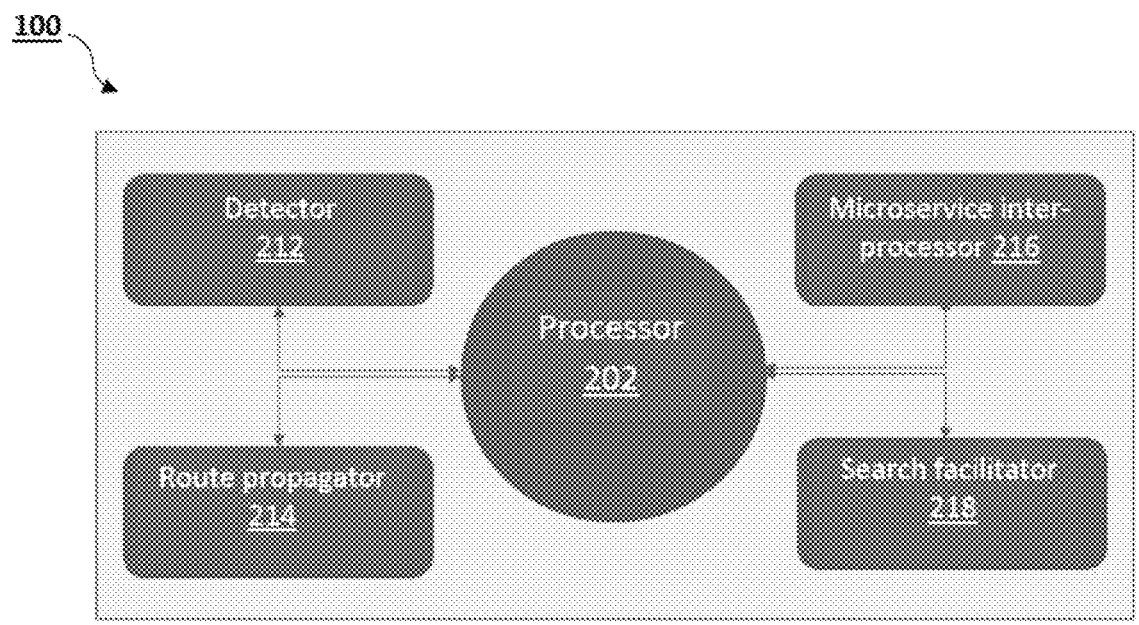
FIG. 3 illustrated broad-level components configured in the system, in accordance with an embodiment of the present subject matter.

The memory 206 is connected to a plurality of modules 208. The modules 208 may be configured within the memory 208 as software modules 208 or the modules 208 may be connected to each of the processor 202, the I/O interface 204 and the memory 206 as hardware modules. The modules 208 comprises an Application programming Interface as a receiving module 210, a detector 212, a route propagator 214, a microservice inter-processor 216, a search facilitator 218, and other modules 220. The system 102 also comprise data 222 stored in a repository 224 and other data 224. In one embodiment, each of the FIG. 3, FIG. 4 and FIG. 5 will now be discussed in combination. FIG. 3 shows broad level components configured in the system 102 and FIG. 4 shows micro-service level details configured in the system 102.

FIG. 3 comprises the detector 212 implemented as infiltration detector, the microservice inter-processor 216, the search facilitator 218 and the route propagator 214 integrated to the processor 202. Each of the infiltration detector (the detector 212), the microservice inter-processor 216, the search facilitator 218 and the route propagator 214 will be discussed in detail in subsequent paragraphs.

Figure 4:
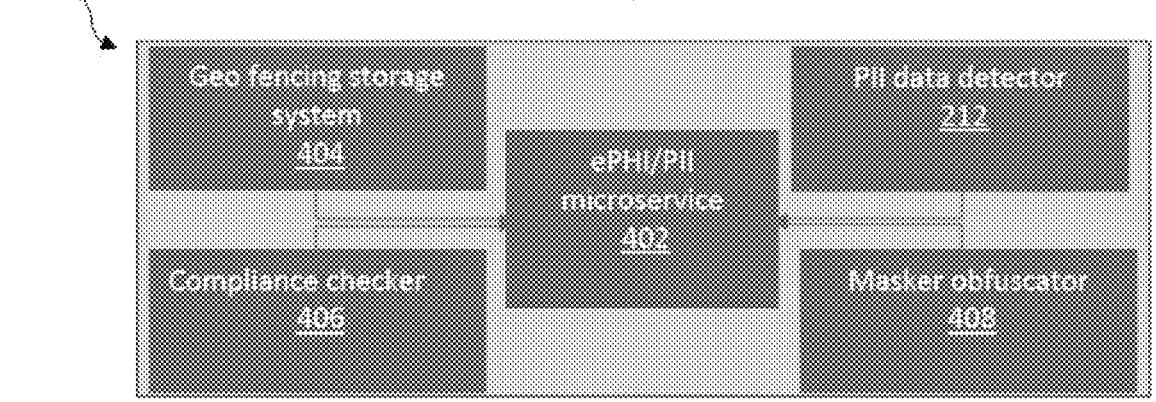
FIG. 4 illustrates additional component details configured in the system for controlling data interception in a communication network, in accordance with an embodiment of the present subject matter.

FIG. 4 comprises each of an ePHI microservice and PII microservices 402 stored in a geo fencing storage system 404, a PII data detector implemented as the detector 212, a compliance checker 406 (also referred as a consent checker) and a masker obfuscator 408. Each of the ePHI microservice 402 and the PII microservice 402 stored in the geo fencing storage system 404 (also referred as geo storage system), the PII detector 212 implemented as the detector 212, the compliance checker 406 and the masker obfuscator 408 will be discussed in detail in subsequent paragraphs.

In one embodiment, referring to FIG. 5, configuration of the system 102 controlling the data interception in the communication network will now be explained. The system 102 receives the one or more requests 502 (microservice request) from a user for accessing one or more microservices 402. The one or more microservices 402 comprises one of a Personal Information Identifier (PII) microservice, or ePHI microservice as shown in FIG. 4. The one or more request comprises one of a secured microservice request 504 or a non-secured microservice request 506.

In an exemplary embodiment, the information comprises at least one of a Personally Identifiable Information (PII) data or Electronic Protected Health Information (ePHI) data. In another exemplary embodiment, the information comprises at least one of URLs or operations associated with one of a REST communication request, HTTP communication request, AMQP communication request or MQTT communication request.

In one embodiment, the user may post the one or more request 502 through one of a mobile app, a web app, a REST/HTTP or an AMQP/MQTT messaging and communication protocol. The one or more requests 502 are received through the Application Programming Interface (API) 204. The examples of REST/HTTP posting data to the URL and reading data from URL are elaborated in the FIG. 6 and FIG. 7, respectively.

Figure 5:
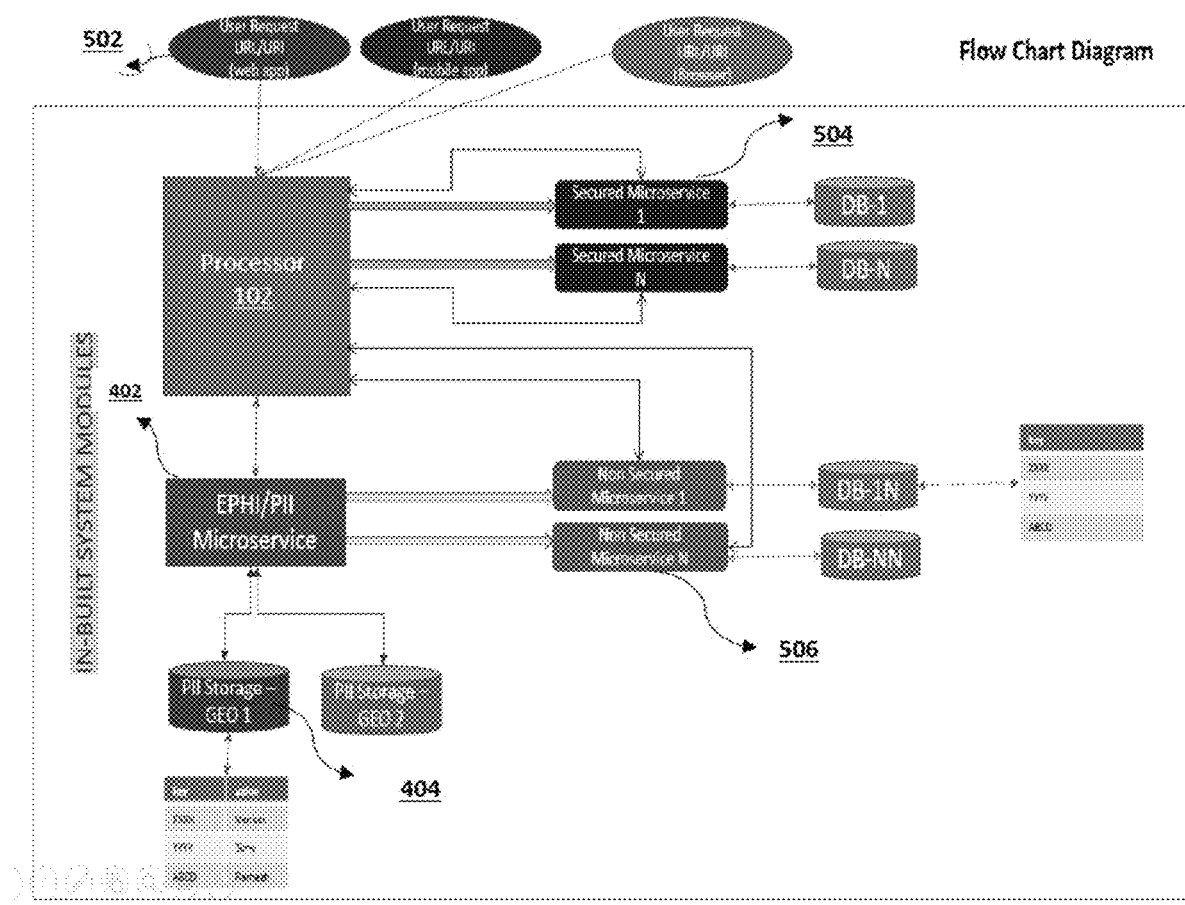
FIG. 5 illustrates detailed of the system for assigning dynamic operation of devices in a communication network, in accordance with an embodiment of the present subject matter.

As shown on FIG. 5, the detector 212 is further configured to classify the one or more request 502 as one of the secured microservice request 504 or a non-secured microservice request 506 based on the detecting. Each of the secured microservice request 504 are stored in a database DB-1 to DB-N and the non-microservice secured request 506 are stored in one of a Database (DB-1N) to database (DB-NN).

After the one or more requests 502 are received, the detector 212 coupled to the processor 202 detects an information associated with one or more requests 502.

The detector 212 is configured to detect the information through predefined rules. The detector 212 comprise the infiltration detector configured to detect at least one of URLs and Operations unique to the one or more request 502 as the information. The infiltration detector stops processing of the one or more request 502 in case any deviation (variation) is detected. In an example, the deviation may refer to an anonymous request.

The predefined rules comprise embodiment of data model to identify the PII data in the one or more request 502. The information related the PII data is detected with one of heuristic rules or learned via machine learning executed as the predefined rules.

Example of the secured microservice request 504 (may also be referred as URL request) is shown below:
http://mysecuredms:9090/json/entity/user/getusers
Further, example for the non-secured microservice request 506 (URL request) is shown below:
http://myopenmms:9091/anonymous/getform/getMedicalArticle/2015. The non-secured microservice request 506 is rejected as the non-secured microservice request 506 comprise anonymous data (fetched as the information).

For example, +01-404-951283 is determined as a phone number instead of mathematical expression. The defined URLs and operations associated with the URL are identified to check in case there is a variation in request for one of secure microservice (the secured microservice request 504) or non-secure microservices (non-secured microservice request 506) and accordingly the request for the non-secured microservice 506 is restricted. For example, http://mymicroservice:9090/v2/getuser/{id} is defined and to be authenticated and is categorized as the secured microservice request 504. However, the request http://mymicroservice:9090/v2/getuser/* is made anonymously and is therefore categorized as the non-secured microservice request 506 and therefore the secured microservice request 504 will now be processed further.

Once one of the request 502 from the one or more requests 502 is classified as the secured microservice request 504, the detector 212 transmits the secured microservice request 504 to the route propagator 212 and request for the issue of the authentication token for the secured microservice request 506.

Once the information is detected, the route propagator 214 is configured to issue the authentication token for each of the secured microservice request 504 based on the detecting. The authentication token stores information detected by the detector 212. The authentication token comprises a JSON Web Token (JWT) authentication token, or a token issued according to an IP address associated with the one or more secured microservice request 504. The authentication token is issued only for the secured microservice request 504 classified by the detector 212.

The microservice inter-processor 216 is then configured to route the one or more secured microservice requests 504 according to the authentication token towards one or more corresponding microservices 402 of the one or more microservices 402. The one or more request 502 are routed for performing one of a data read operation or data write operation over the database storing the one or more microservices 502.

The microservice inter-processor 216 is configured to enable a communication between the request for the one or more microservices 502 and acts as bridge for calling the one or more microservices 402 according to the requests 502 (otherwise direct connection between the secured microservice request 504 and the non-secure microservice request 506 is not allowed and each of the secured microservice request 504 and the non-secured microservice request 506 is passed through the microservice inter-processor 216).

The system 102 further uses an interceptor module stored in the memory 206 (not shown in FIG.) configured to intercept the corresponding PII microservice 402 for each of the non-secured microservice request 506 routed to the PII microservice. The PII microservice 402 calls a respective non secured microservice for the non-secured microservice request 506 and transmits the information with masking to a database table along with details specification associated with the non-secured microservice request 506.

Here, the PII microservice understands the PII data information and other operation to do further processing of the non-secured microservice request 506.

As shown in FIG. 4 and FIG. 5, the masker obfuscator 408 is configured to de-identify data (information) for the non-secured microservice request 506 and routes the non-secured microservice request 506 to a respective database through the microservice 402 configured for the non-secured microservice requests 506. The system 102 has an inbuilt algorithm to mask the data for the non-secured microservice requests 506 with obfuscation and the keys are stored in a corresponding database for non-secured microservices 506. Below is the example of the microservice 402 configured with built-in algorithm details:

Plug.anonymize.type: "partReplaceStar" or "partReplaceNumbers"—is an example of the algorithm used for masking. Based on specification of the non-secured microservice request 506, the processor 202 may generates the values for masking the data.

Plug.configuration.type: "non-secured"
Plug.configuration.urls: "http://myopenurl:8080,http://myopenurlother:9090"

The memory 206 also comprise a geo fencing module (not shown in Figure) configured to store each of the authentication token and the information in the geo storage system 404 (also referred as a geo fencing database or a geo fencing storage system) for each of the microservice request 502. Once the PII microservice is identified, the PII microservice retrieves the information (geo specifications) through the search facilitator 218 from the geo storage system 404. Search facilitator searches the PII data across geo specifications stored in the geo storage system 404 for generating response for the secured microservice request 504.

The geo specification (or the information) in the geo storage system 404 is stored as PII data with a corresponding key and value. The goo storage system 406 for calling the microservice is identified according to one of the JWT token or IP. Potential PII data is stored in the geo storage system 404 with at least one key and at least one value. The database storing non-secured microservices 506 (also referred as a non-secured microservice database) will have the key tagged along with normal data, such that normal data does not identify each of the ePHI data or the PII data.

In an example embodiment, the information may be referred as json data. The json data is interpreted through the interpretation module (not shown in FIG.) based on one or more predefined tags. The predefined tags comprise one of a user's name, user's date of birth and the tags are then identified as the Personal Identifier Information (PII).

An internal machine learning mechanism interprets the Json data inference (json data) and provide a recommendation and action to classify the tags. The data fencing module is further configured to enable an accessibility of the json data based on from a location of the user posting the one or more request, and then the access is provided based on the location. The geo storage system 404 (geo specific pii storage) is provided with key identifiers with the json data. The key identifiers are used for interpreting and intercepting the data. The internal machine learning mechanism details on the interpretation of textual content from the json data and tries to build a library. From below example, the internal learning algorithm classify different types of each of the tag and create tag as a data model.

```
{
"deviceType: "medicalGateway",
"deviceOperation":"virtual",
}
```

Still referring to FIG. 4 and FIG. 5, the compliance checker 406 helps to adhere to the predefined rules executed by the detector 212 for identifying the PII data. The compliance checker 406 is configured to ensure geo specific rules while routing the secured microservice request 504 to the PII microservice 402.

Figure 6:
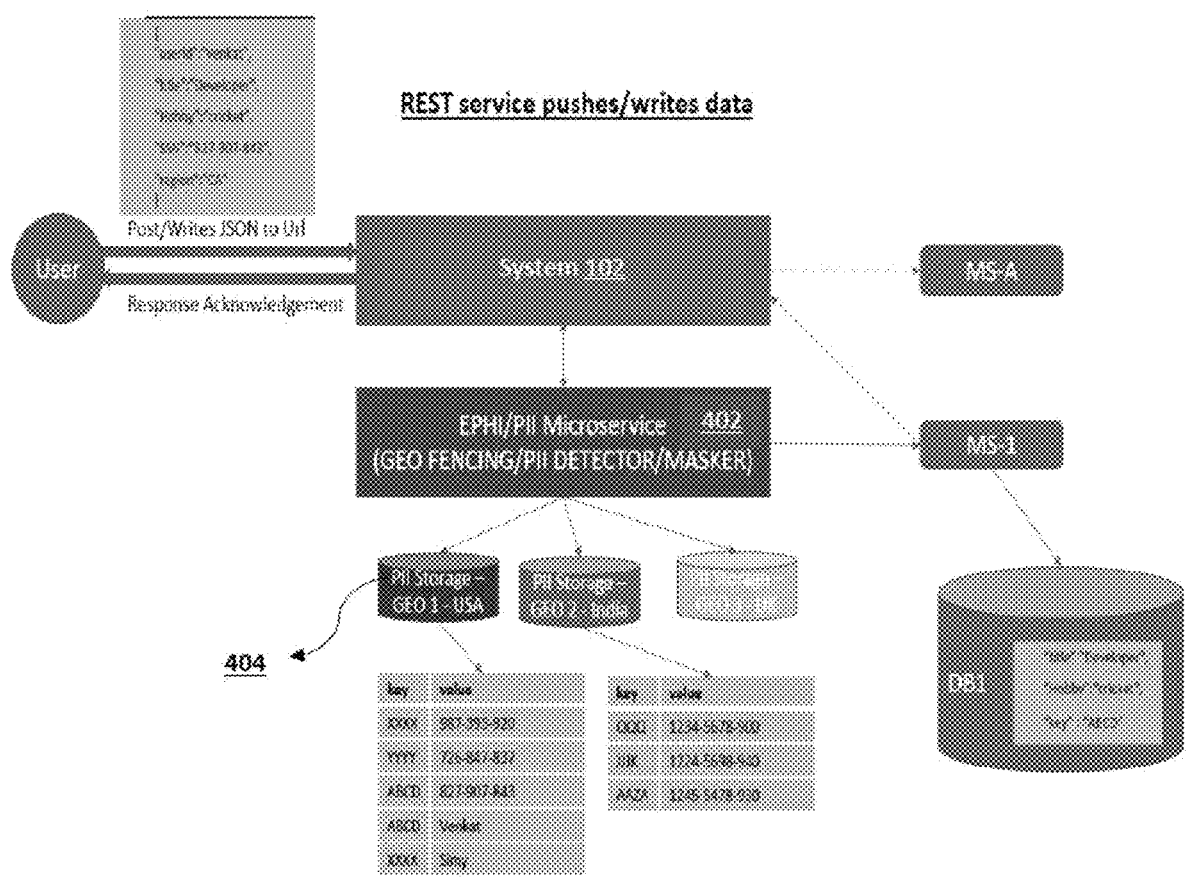
FIG. 6 illustrates details of push operation and write operation executed through system for assigning dynamic operation of devices in a communication network, in accordance with an embodiment of the present subject matter.

In another embodiment, referring to FIG. 6, operation of pushing the one or more request (push data) and write data request (writing data) through the system 102 is shown. According to the authentication token (JSON), the one or more requests 502 are posted or written to URL. The processor 202 further receives a response acknowledgement once the one or more requests 502 are posted or written. The non-secured microservice requests 506 are transmitted to a respective database through a corresponding microservice.

The secured microservice requests 504 are then routed to at least one of the EPHI microservice 402 or the PII microservice 402 in the Geo fencing database 404. For example, the secured microservice request 504 are routed to the one of the PII storage GEO-1 USA, PII storage GEO-2 India, or PII storage GEO-3 UK as shown in FIG. 6. The information stored in the geo specific database 404 is tagged with the key and the value associated with the key. As shown in exemplary embodiment of FIG. 6, MS-1 refers to a database DB1 storing secured microservices 504 and MS-A refers to a database storing the non-secured microservices 506.

Figure 7:
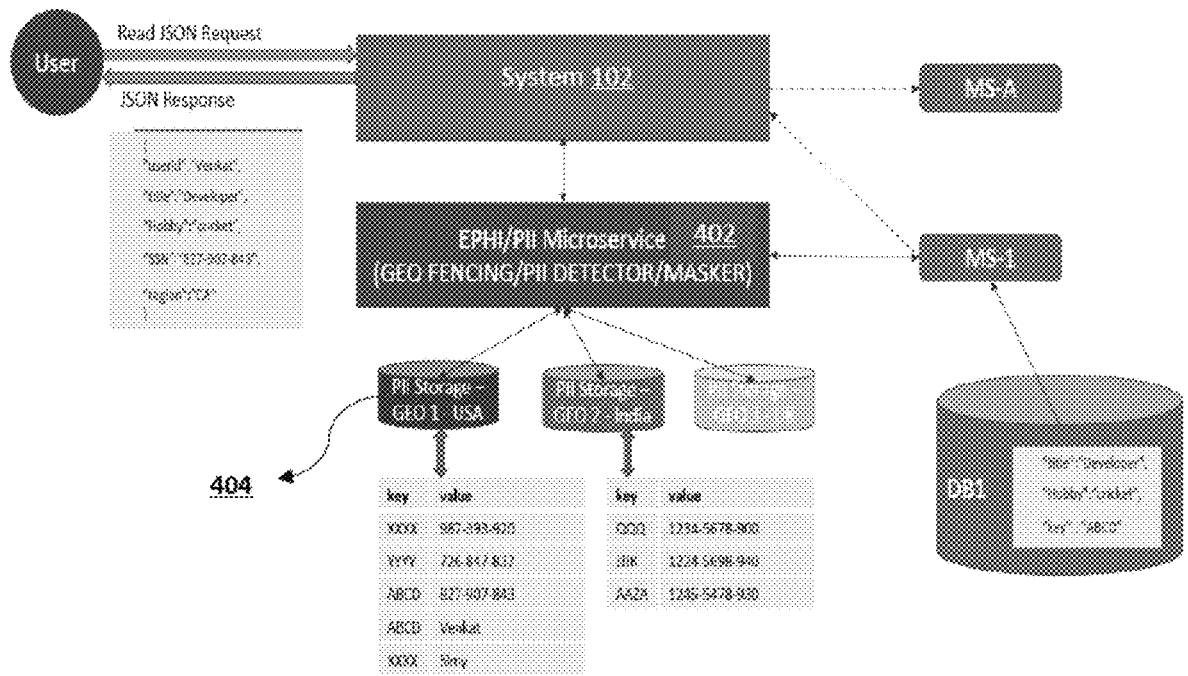
FIG. 7 illustrates details of read operation executed through system for assigning dynamic operation of devices in a communication network, in accordance with an embodiment of the present subject matter.

In another embodiment, referring to FIG. 7, operation of reading the one or more request (read data) through the system 102 is shown. According to a user's request for the JSON, the one or more requests 502 are read by the processor 202. The processor 202 further receives a response acknowledgement once the read request received by the user. The detector 212 then intercepts the request to identify the microservice to be accessed for operation of the read data.

The detector 212 identifies the request as the secured microservice request 504 in case the request demands personal information for the read operation data and the request is routed for calling the PII microservice 402. The information is then retrieved from the Geo storage system 404 and a response is transmitted to the user for completing the read operation by the system 102.

Figure 8:
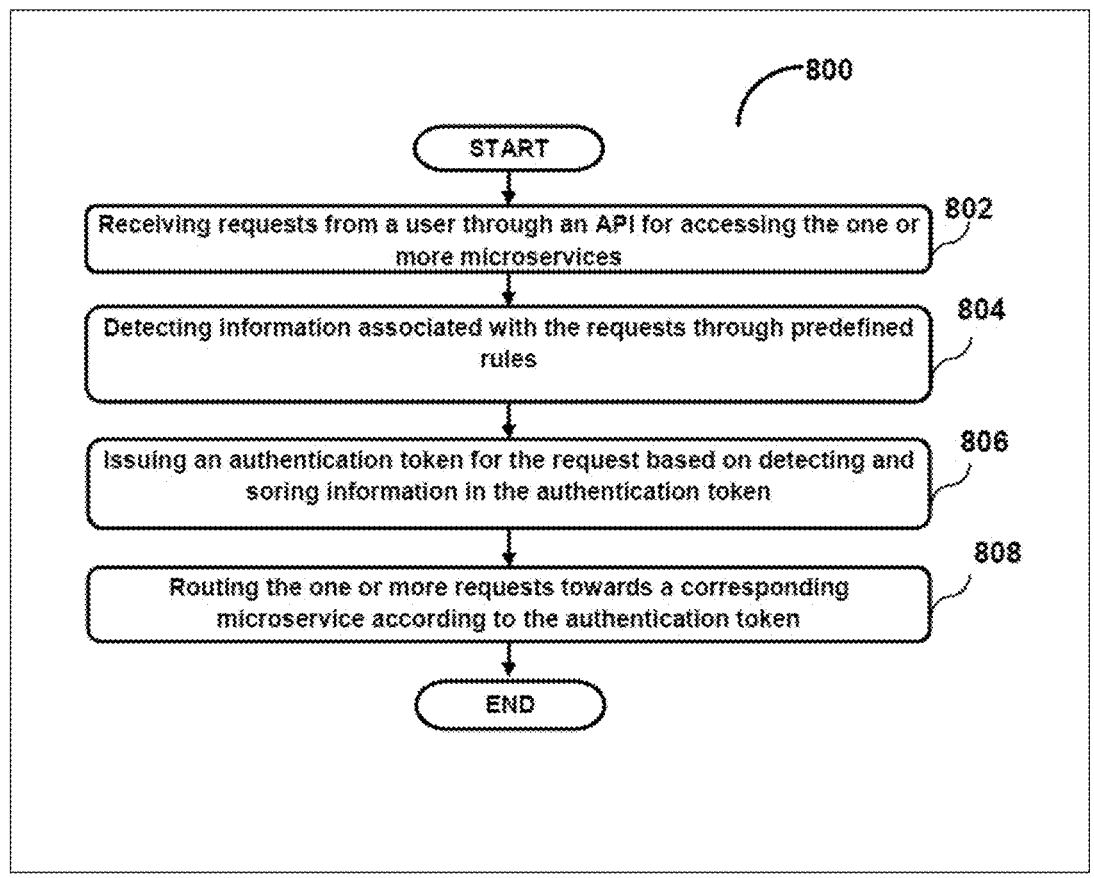
FIG. 8 illustrates flowchart for a method controlling data interception in a communication network, in accordance with an embodiment of the present subject matter.

Referring now to FIG. 8, a method 800 for controlling data interception in a communication network, is disclosed in accordance with an embodiment of the present subject matter. The method 800 may be described in the general context of computer executable instructions. Generally, computer executable instructions can include routines, programs, objects, components, data structures, procedures, modules, functions, and the like, that perform particular functions or implement particular abstract data types. The method 800 may also be practiced in a distributed computing environment where functions are performed by remote processing devices that are linked through a communications network. In a distributed computing environment, computer executable instructions may be located in both local and remote computer storage media, including memory storage devices.

The order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the subject matter described herein. Furthermore, the method 800 can be implemented in any suitable hardware, software, firmware, or combination thereof. However, for ease of explanation, in the embodiments described below, the method 700 may be considered to be implemented in the above described system 102.

At block 802, the one or more requests 502 from a user for accessing the one or more microservices are received through the API 204.

At block 804, the information associated with the one or more requests 504 is detected. The information is detected through the detector 212 of system 102. Furthermore, the detector 212 detects the information through predefined rules.

The information comprises at least one of the Personally Identifiable Information (PII) data or the Electronic Protected Health Information (ePHI) data. The information comprises also comprises at least one of the URLs or operations associated with one of the REST communication request, the HTTP communication request, the AMQP communication request or the MQTT communication request.

At block 806, the authentication token is issued for each of the one or more request 502 based on the detecting. The authentication token is issued by the route propagator 214 of the system 102. The authentication token stores information detected by the detector 212.

The authentication token comprises the JSON Web Token (JWT) authentication token, or the token issued according to the IP address associated with the one or more request 502.

At block 808, the one or more requests 502 are routed to towards the one or more corresponding microservices of the one or more microservices 402. The one or more requests 502 are routed according to the authentication token.

Figure 9:
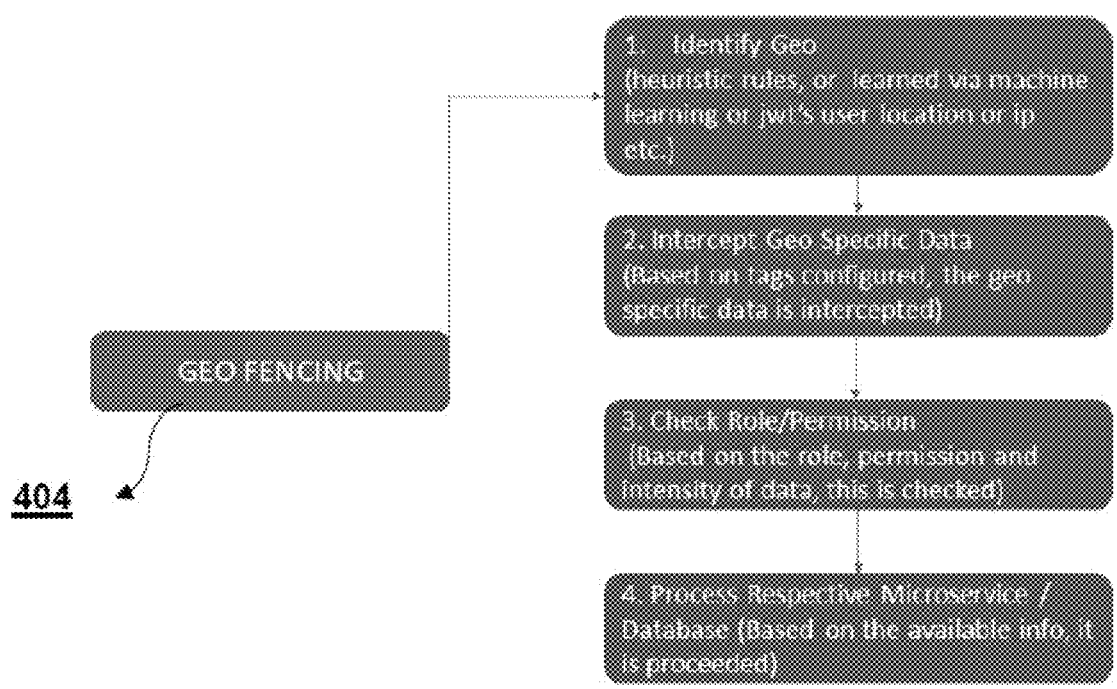
FIG. 9 illustrates flowchart for additional details of the method controlling data interception in a communication network, in accordance with an embodiment of the present subject matter.

In another exemplary embodiment, FIG. 9 shows details of the method 800. In step 1 of FIG. 9, according to the predefined rules and the identification of the request as one of the secured microservice request 504, or the non-secured microservice request 506, the Geo storage system 404 to be accessed is identified. The predefined rules comprise heuristic rules, rules learned via machine learning or JWT's user or ip address.

In step 2 of FIG. 9, the requests 502 are then processed by intercepting information stored in the geo storage system 404. The information is intercepted according to tags attached to the information. The tags refer to data model or fields derived from the information. The access to the PII microservice 402 towards the secured microservice request 504 is then checked or permission is obtained in step 3 of FIG. 9. Based on permission, in step 4 of FIG. 9, the secured microservice request 504 is processed through the respective microservice database for retrieving the information and sharing the information with the user.

Exemplary embodiments discussed above may provide certain advantages. Though not required to practice aspects of the disclosure, the advantages may include those provided by the following features.

Some embodiments of the system and the method may be configured to protect an identity and confidentiality and data transmission loss to prevent security breaches by classifying requests and one of secured request of non-secured requests and routing the requests based on ePHI or PII definitions.

Some embodiments of the system and the method may be configured to provide intercept information according to PII and reducing overall cost in development of a separate intercepting system.

Some embodiments of the system and the method may be configured to provide a data interception without employing a change in existing communication network or devices integrated with the communication network. Such a system and method may be configured without configuration overhead.

Although implementations for systems and methods for assigning dynamic operation of devices in a communication network, it is to be understood that the appended claims are not necessarily limited to the specific features or methods described. Rather, the specific features and methods are disclosed as examples of implementations for assigning dynamic operation of devices in a communication network.

We claim:

1. A method for controlling data interception in a communication network, the method comprising:
   receiving, through an Application Programming Interface (API), one or more requests from a user for accessing one or more microservices;
   detecting, through a detector, information associated with the one or more requests, wherein the information is detected through predefined rules;
   classifying, by the detector, the one or more requests as a secured microservice request in case the detected information is detected based on a pre-defined heuristic rules and a non-secured microservice request in case the detected information comprises anonymous data;
   for each of the one or more requests classified as the secured microservice request:
      issuing, through a route propagator, an authentication token for each of the secured microservice requests based on the detecting, wherein the authentication token stores the information detected by the detector; and
      routing, through the route propagator, the one or more requests according to the authentication token towards one or more corresponding microservices of the one or more microservices.

2. The method as claimed in claim 1, wherein the information comprises at least one of a Personally Identifiable Information (PII) data or Electronic Protected Health Information (ePHI) data.

3. The method as claimed in claim 1, wherein the information comprises at least one of URLs or operations associated with one of a Representational State Transfer (REST) communication request, Hypertext Transfer Protocol (HTTP) communication request, Advanced Message Queuing Protocol (AMQP) communication request or MQ Telemetry Transport (MQTT) communication request.

4. The method as claimed in claim 1, wherein the detection of the information associated with the one or more requests further comprises:
issuing the authentication token for the secured microservice request.

5. The method as claimed in claim 1, wherein the authentication token comprises a token issued according to an IP address associated with the one or more request.

6. The method as claimed in claim 1, comprising:
storing, each of the authentication tokens and the information in a geo storage system for each of the secured microservice requests; and
searching, through a search facilitator, Personal Identifier Information (PII) data across geo specifications stored in the geo storage system for generating responses for the secured microservice request, wherein the geo specifications comprise a corresponding key and a value for the key identifying the PII data.

7. The method as claimed in claim 1, wherein the one or more microservices comprises one of a Personal Identifier Information (PII) microservice, or ePHI microservice.

8. A system for controlling data interception in a communication network, the system comprising:
a processor,
an Application Programming Interface (API); and
a memory coupled to the processor, wherein the memory stores a plurality of instructions to be executed by the processor, wherein the processor is configured to:
receive, through the API, one or more requests from a user for accessing one or more microservices;
detect, through a detector, information associated with one or more requests, wherein the information is detected through predefined rules;
classify, by the detector, the one or more requests as a secured microservice request in case the detected information is detected based on a pre-defined heuristic rules and a non-secured microservice request in case the detected information comprises anonymous data;
for each of the one or more requests classified as the secured microservice request:
issue, through a route propagator, an authentication token for each of the secured microservice requests based on the detecting, wherein the authentication token stores information detected by the detector, and
route, through the route propagator, the one or more requests according to the authentication token towards one or more corresponding microservices of the one or more microservices.

9. The system as claimed in claim 8, wherein the information comprises at least one of a Personally Identifiable Information (PII) data or Electronic Protected Health Information (ePHI) data.

10. The system as claimed in claim 8, wherein the information comprises at least one of URLs or operations associated with one of a Representational State Transfer (REST) communication request, Hypertext Transfer Protocol (HTTP) communication request, Advanced Message Queuing Protocol (AMQP) communication request or MQ Telemetry Transport (MQTT) communication request.

11. The system as claimed in claim 8, wherein the detector is configured to:
issue of the authentication token for the secured microservice request.

12. The system as claimed in claim 8, wherein the authentication token comprises a token issued according to an IP address associated with the one or more request.

13. The system as claimed in claim 8, wherein the processor is configured to:
store, each of the authentication tokens and the information in a geo storage system for each of the secured microservice requests; and
search, through a search facilitator, Personal Identifier Information (PII) data across geo specifications stored in the geo storage system for generating responses for the secured microservice request, wherein the geo specifications comprise a corresponding key and a value for the key identifying the PII data.

14. The system as claimed in claim 13, wherein the processor is further configured to:
interpret the information and provide a recommendation and action based on one or more predefined tags associated with the information, wherein the information comprises data inference, and wherein the one or more predefined tags comprise user's personal information.

15. The system as claimed in claim 8, wherein the one or more microservices comprises one of a PII microservice, or ePHI microservice.

* * * * *